United States Patent
Kimura

(10) Patent No.: US 9,908,280 B2
(45) Date of Patent: Mar. 6, 2018

(54) METHOD OF MANUFACTURING FUEL TANK AND FUEL TANK

(71) Applicant: TOYOTA JIDOSHA KABUSHIKI KAISHA, Toyota-shi (JP)

(72) Inventor: Miki Kimura, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/032,519

(22) PCT Filed: Nov. 5, 2014

(86) PCT No.: PCT/IB2014/002430
§ 371 (c)(1),
(2) Date: Apr. 27, 2016

(87) PCT Pub. No.: WO2015/068028
PCT Pub. Date: May 14, 2015

(65) Prior Publication Data
US 2016/0271861 A1    Sep. 22, 2016

(30) Foreign Application Priority Data

Nov. 6, 2013 (JP) ................. 2013-230685

(51) Int. Cl.
*B29C 65/70* (2006.01)
*B29C 51/12* (2006.01)
(Continued)

(52) U.S. Cl.
CPC .............. *B29C 51/12* (2013.01); *B29C 51/06* (2013.01); *B29C 51/10* (2013.01); *B29C 51/14* (2013.01);
(Continued)

(58) Field of Classification Search
CPC .......................... B29C 51/12; B60K 15/03177
(Continued)

(56) References Cited

U.S. PATENT DOCUMENTS 5,308,427 A * 5/1994 Duhaime ................ B29C 65/72
156/245
6,679,399 B2  1/2004 Franjo et al.
(Continued)

FOREIGN PATENT DOCUMENTS

CA     2 641 463 A1    8/2007
JP    2008-507651 A    3/2008
(Continued)

OTHER PUBLICATIONS

Office Action dated Mar. 24, 2017 in co-pending U.S. Appl. No. 14/798,789.
(Continued)

*Primary Examiner* — Galen Hauth
(74) *Attorney, Agent, or Firm* — Oblon, McClelland, Maier & Neustadt, L.L.P.

(57) ABSTRACT

A method of manufacturing a fuel tank includes: an introducing process in which a molten resin sheet formed with a tank body is introduced in a forming mold; a shaping process in which a movable member abuts against the molten resin sheet to form a molten resin projection projected in a thickness direction of the molten resin sheet; an arranging process in which the molten resin projection is inserted in an attachment hole provided in an attachment part, and the attachment part is arranged on the molten resin sheet; and a machining process in which the molten resin projection is pressurized by a pressurizing member, so as to bulge out a portion of the molten resin projection to an outer peripheral side.

10 Claims, 12 Drawing Sheets

(51) Int. Cl.

| | | |
|---|---|---|
| *B29C 65/18* | (2006.01) | |
| *B29C 65/30* | (2006.01) | |
| *B29C 65/60* | (2006.01) | |
| *B29C 65/00* | (2006.01) | |
| *B29C 51/06* | (2006.01) | |
| *B29C 51/10* | (2006.01) | |
| *B29C 51/14* | (2006.01) | |
| *B29C 51/26* | (2006.01) | |
| *B29C 51/44* | (2006.01) | |
| *B29L 31/00* | (2006.01) | |
| *B29C 51/34* | (2006.01) | |
| *B60K 15/03* | (2006.01) | |
| *B29K 23/00* | (2006.01) | |

(52) U.S. Cl.
CPC ............ *B29C 51/262* (2013.01); *B29C 51/44* (2013.01); *B29C 65/18* (2013.01); *B29C 65/30* (2013.01); *B29C 65/607* (2013.01); *B29C 66/21* (2013.01); *B29C 66/532* (2013.01); *B29C 66/61* (2013.01); *B29C 66/7234* (2013.01); *B29C 66/8242* (2013.01); *B29C 66/83221* (2013.01); *B60K 15/03177* (2013.01); *B29C 51/343* (2013.01); *B29C 66/71* (2013.01); *B29C 66/8122* (2013.01); *B29C 2791/006* (2013.01); *B29C 2791/007* (2013.01); *B29K 2023/065* (2013.01); *B29K 2023/086* (2013.01); *B29K 2823/086* (2013.01); *B29K 2995/0067* (2013.01); *B29K 2995/0069* (2013.01); *B29L 2031/7172* (2013.01); *B29L 2031/737* (2013.01); *B60K 2015/03032* (2013.01); *B60K 2015/03453* (2013.01); *B60K 2015/03493* (2013.01)

(58) Field of Classification Search
USPC ........................................................ 264/249
See application file for complete search history.

(56) References Cited

U.S. PATENT DOCUMENTS

| | | | |
|---|---|---|---|
| 8,161,621 B2* | 4/2012 | Ratfisch | ................ B21K 25/00 |
| | | | 29/243.53 |
| 2008/0164639 A1 | 7/2008 | Criel et al. | |
| 2008/0164693 A1 | 7/2008 | Weems et al. | |
| 2009/0152263 A1 | 6/2009 | Criel et al. | |
| 2010/0126659 A1 | 5/2010 | Roos et al. | |
| 2011/0139793 A1 | 6/2011 | Park | |
| 2012/0326357 A1 | 12/2012 | Roos et al. | |
| 2014/0034649 A1 | 2/2014 | Criel et al. | |
| 2014/0117591 A1 | 5/2014 | Roos et al. | |
| 2014/0131918 A1 | 5/2014 | Criel et al. | |
| 2016/0016347 A1 | 1/2016 | Kimura et al. | |
| 2016/0158992 A1 | 6/2016 | Criel et al. | |

FOREIGN PATENT DOCUMENTS

| | | |
|---|---|---|
| JP | 2008-517807 A | 5/2008 |
| JP | 2010-526682 A | 8/2010 |
| JP | 2012-501265 A | 1/2012 |
| JP | 2012-66587 A | 4/2012 |
| JP | 2015-85916 A | 5/2015 |
| WO | WO 2006/008308 A1 | 1/2006 |
| WO | 2015/010915 A1 | 1/2015 |
| WO | WO 2015/063582 A1 | 5/2015 |

OTHER PUBLICATIONS

Office Action dated Sep. 6, 2016 in co-pending U.S. Appl. No. 14/798,789.

International Search Report dated Feb. 19, 2015, in PCT/IB2014/002430 filed Nov. 5, 2014.

Notice of Allowance dated Jul. 28, 2017 in U.S. Appl. No. 14/798,789, filed Jul. 14, 2015 (8 pages).

* cited by examiner

METHOD OF MANUFACTURING FUEL TANK AND FUEL TANK

BACKGROUND OF THE INVENTION

1. Field of the Invention

The present invention relates to a method of manufacturing a fuel tank and a fuel tank.

2. Description of Related Art

As a method of attaching an attachment part to a fuel tank formed of a resin, a method has been available in which a portion of a molten resin sheet, of which a fuel tank is formed, is projected by a movable member to form a molten resin projection, the movable member is pulled out of the molten resin projection after this molten resin projection is inserted in an attachment hole that is provided in the attachment part, the molten resin projection is then pressurized by a pressurizing member to expand, and the molten resin is cooled and hardened in a state that a periphery of the attachment hole of the attachment part is held between an expanded portion and the molten resin sheet, so as to fix the fuel tank and the attachment part (for example, U.S. Pat. No. 5,308,427).

In U.S. Pat. No. 5,308,427, after the movable member is pulled out of the molten resin projection, a portion of the molten resin projection, of which the movable member is pulled out, is filled with a core formed of the molten resin, so as to retain a shape of the molten resin projection.

Here, when the movable member moves in a direction to be pulled out of the molten resin projection, the inside of the molten resin projection is brought into a vacuum state. Consequently, the molten resin projection is deformed by following the movement of the movable member and thus turns into an odd shape. Thus, the pressurizing member has to be actuated at a high speed and a high pressure to pressurize and deform the molten resin projection.

However, when the pressurizing member is actuated at the high speed and the high pressure, there is a possibility that a portion of the molten resin that forms the molten resin projection is pushed back to a general section of the molten resin sheet and an amount of the resin required to form an attachment section that is used to attach the attachment part to the fuel tank cannot be secured. Thus, a sufficient amount of the resin needs to be secured by thickening the molten resin sheet, so that the amount of the resin that is required to form the attachment section of the fuel tank can be secured even when the portion of the molten resin is pushed back by pressurization.

In addition, in U.S. Pat. No. 5,308,427, since the molten resin projection is filled with the core, the amount of the resin for the fuel tank tends to increase.

SUMMARY OF THE INVENTION

The present invention obtains a method of manufacturing a fuel tank that can suppress an amount of a resin for a fuel tank from increasing and can secure strength of an attachment section that is used to attach an attachment part to the fuel tank, and also obtains a fuel tank that can suppress an amount of a resin from increasing and can secure strength of an attachment section that is used to attach an attachment part.

A method of manufacturing a fuel tank according to one aspect of the present invention includes: introducing a molten resin sheet in a forming mold, the molten resin sheet being formed with a tank body formed of a resin; shaping a molten resin projection by forming a molten resin projection and abutting a movable member against the molten resin sheet, the molten resin projection being projected in a thickness direction of the molten resin sheet; arranging an attachment part on the molten resin sheet by inserting the molten resin projection in the attachment hole provided in an attachment part; and machining to make a portion of the molten resin projection bulge out to an outer peripheral side by moving a movable member in an opposite direction from a projecting direction of the molten resin projection while pressurizing the molten resin projection by a pressurizing member in the opposite direction from the projecting direction of the molten resin projection.

In the method of manufacturing a fuel tank according to the one aspect of the present invention, since the portion of the molten resin projection bulges out to a periphery of the attachment hole of the attachment part during pressurization of the molten resin projection, an attachment section (configured by including a projection and a portion that bulges out from the projection) that is used to attach the attachment part to the fuel tank is formed in the tank body after the molten resin is cooled and hardened.

In addition, while the portion of the molten resin projection is machined to bulge out to the outer peripheral side, the movable member moves in the opposite direction from the projecting direction of the molten resin projection while the molten resin projection is pressurized by the pressurizing member in the opposite direction from the projecting direction of the molten resin projection. Thus, even when the pressurizing member is actuated at a low speed under a low load, the molten resin projection is less likely to be in an odd shape. Therefore, the pressurizing member can be actuated at the low speed under the low load. Here, when the pressurizing member is actuated at the low speed under the low load, a portion of the molten resin that forms the molten resin projection can be suppressed from being pushed back to the molten resin sheet. Thus, an amount of the resin that is required to form the attachment section of the fuel tank is secured. Therefore, strength of the attachment section of the fuel tank is secured. In addition, when the pressurizing member is actuated at the low speed under the low load, there is no need to thicken the molten resin sheet in order to secure the amount of the resin that is required to form the attachment section of the fuel tank. Thus, the amount of the resin for the fuel tank can be suppressed from increasing.

The method of manufacturing a fuel tank according to the one aspect of the present invention has such a superior effect that the strength of the attachment section that is used to attach the attachment part to the fuel tank can be secured while the amount of the resin for the fuel tank is suppressed from increasing.

In the method of manufacturing a fuel tank, while the portion of the molten resin projection is machined to bulge out to the outer peripheral side, the movable member and the pressurizing member may move with a constant clearance being kept between the movable member and the pressurizing member during the pressurization of the molten resin projection.

In the method of manufacturing a fuel tank, while the portion of the molten resin projection is machined to bulge out to the outer peripheral side, the movable member and the pressurizing member move with the constant clearance being kept between the movable member and the pressurizing member during the pressurization of the molten resin projection. Therefore, the molten resin projection can stably be deformed in a specified shape.

The method of manufacturing a fuel tank has such a superior effect that the molten resin projection can stably be deformed in the specified shape during the pressurization.

In the method of manufacturing a fuel tank, while the portion of the molten resin projection is machined to bulge out to the outer peripheral side, the movable member may start moving in the opposite direction from the projecting direction of the molten resin projection when the pressurizing member abuts against the molten resin projection.

In the method of manufacturing a fuel tank, while the portion of the molten resin projection is machined to bulge out to the outer peripheral side, the movable member starts moving in the opposite direction from the projecting direction of the molten resin projection when the pressurizing member abuts against the molten resin projection. Therefore, a top of the molten resin projection can be suppressed from becoming extremely thin.

The method of manufacturing a fuel tank has such a superior effect that the top of the molten resin projection can be suppressed from becoming extremely thin during the pressurization.

In the method of manufacturing a fuel tank, while the portion of the molten resin projection is machined to bulge out to the outer peripheral side, the movable member may start moving in the opposite direction when the clearance between the movable member and the pressurizing member becomes a predetermined value.

In the method of manufacturing a fuel tank, while the portion of the molten resin projection is machined to bulge out to the outer peripheral side, the movable member starts moving in the opposite direction from the projecting direction of the molten resin projection when the clearance between the movable member and the pressurizing member becomes the predetermined value. Therefore, the top of the molten resin projection can be suppressed from becoming extremely thin by setting the predetermined value to the same value as a thickness of a general section of the molten resin sheet, for example.

The method of manufacturing a fuel tank has such a superior effect that the top of the molten resin projection can be suppressed from becoming extremely thin during the pressurization.

In the method of manufacturing a fuel tank, during formation and shaping of the molten resin projection, the molten resin sheet may be arranged along a mold surface of the forming mold in a state that the movable member is projected from the mold surface, and the molten resin projection may be formed.

In the method of manufacturing a fuel tank, during the formation and shaping of the molten resin projection, the molten resin sheet is arranged along the mold surface of the forming mold in the state that the movable member is projected from the mold surface. Thus, the molten resin projection is pressurized on the mold surface. This allows the molten resin projection to be stably deformed in the specified shape. Therefore, the attachment part can stably be attached to the fuel tank.

The method of manufacturing a fuel tank has such a superior effect that the attachment part can stably be attached to the fuel tank.

In the method of manufacturing a fuel tank, during the formation and shaping of the molten resin projection, the molten resin sheet may be arranged along the mold surface of the forming mold, then the movable member may be projected from the mold surface, and the molten resin projection may be formed.

In the method of manufacturing a fuel tank, during the formation and shaping of the molten resin projection, the molten resin sheet is arranged along the mold surface of the forming mold, then the movable member is projected, and the molten resin projection is formed. Thus, the molten resin projection is pressurized on the mold surface. This allows the molten resin projection to be stably deformed in the specified shape. Therefore, the attachment part can stably be attached to the fuel tank.

The method of manufacturing a fuel tank has such a superior effect that the attachment part can stably be attached to the fuel tank.

In the method of manufacturing a fuel tank, during the formation and shaping of the molten resin projection, a space between the forming mold and the molten resin sheet may be depressurized, and the molten resin sheet may be arranged along the mold surface. Alternatively, a space between a pressure forming mold that is mated with the forming mold and the molten resin sheet may be pressurized, and the molten resin sheet may be arranged along the mold surface.

In the method of manufacturing a fuel tank, during the formation and shaping of the molten resin projection, the space between the forming mold and the molten resin sheet is depressurized, and the molten resin sheet is arranged along the mold surface. Thus, it is possible to suppress complication of a manufacturing process or complication and enlargement of a manufacturing device. On the other hand, also when the space between the pressure forming mold that is mated with the forming mold and the molten resin sheet is pressurized, and when the molten resin sheet is arranged along the mold surface, it is possible to suppress complication of the manufacturing process or complication and enlargement of the manufacturing device.

The method of manufacturing a fuel tank has such a superior effect that it is possible to suppress complication of the manufacturing process or complication and enlargement of the manufacturing device.

In the method of manufacturing a fuel tank, during the formation and shaping of the molten resin projection, the molten resin sheet may be arranged along the mold surface after the space between the forming mold and the molten resin sheet is pressurized to stretch the molten resin sheet and an extra length is secured with respect to the mold surface, or after the space between the pressure forming mold that is mated with the forming mold and the molten resin sheet is depressurized to stretch the molten resin sheet and the extra length is secured with respect to the mold surface.

In the method of manufacturing a fuel tank, during the formation and shaping of the molten resin projection, the molten resin sheet is arranged along the mold surface after the molten resin sheet is stretched to secure the extra length with respect to the mold surface. Thus, it is possible to prevent a locally thin section from being produced in the molten resin sheet when the molten resin projection is formed.

The method of manufacturing a fuel tank has such a superior effect that it is possible to prevent a locally thin section from being produced in the molten resin sheet when the molten resin projection is formed.

In the method of manufacturing a fuel tank, during introduction of the molten resin sheet in the forming mold, the molten resin sheet, the extra length of which is secured with respect to the mold surface, may be introduced in the forming mold.

In the method of manufacturing a fuel tank, during the introduction of the molten resin sheet in the forming mold, the molten resin sheet, the extra length of which is secured with respect to the mold surface, is introduced in the forming mold. Thus, it is possible to prevent the locally thin section from being produced in the molten resin sheet when the molten resin projection is formed.

The method of manufacturing a fuel tank has such a superior effect that it is possible to prevent the locally thin section from being produced in the molten resin sheet when the molten resin projection is formed.

In the method of manufacturing a fuel tank, that the molten resin sheet has an extra length portion with respect to the mold surface of the forming mold may include that a surface area of a formed surface of the molten resin sheet is set larger than a surface area of the mold surface so that the molten resin sheet has an extra portion.

In the method of manufacturing a fuel tank, a magnet of the movable member may be embedded in a tip of the movable member, a magnet of the pressurizing member may be embedded in the pressurizing member, and the magnet of the movable member and the magnet of the pressurizing member may be arranged in a direction to generate a repulsive force between the magnet of the movable member and the magnet of the pressurizing member.

A fuel tank according to another aspect of the present invention includes: a tank body that is formed of a resin and can store fuel; a projection that is formed in the tank body, the projection being projected in a thickness direction of the tank body, the projection having a cylindrical shape that is hollow and a top of which is closed, the projection being inserted in an attachment hole provided in an attachment part, a thickness of the top of the projection being at least equal to a thickness of a general section of the tank body, and a thickness of a portion of the projection inserted in the attachment hole being at least equal to the thickness of the general section of the tank body; and a bulge that is formed in the projection, the bulge bulging out to an outer peripheral side of the projection, and a periphery of the attachment hole of the attachment part being held between the bulge and the general section of the tank body, so as to attach the attachment part to the tank body.

In the fuel tank according to the other aspect of the present invention, the thickness of the top of the projection is at least equal to the thickness of the general section of the tank body, and the thickness of the portion of the projection inserted in the attachment hole is at least equal to the thickness of the general section of the tank body. Thus, strength of an attachment section (a projection and the bulge) that is used to attach the attachment part can be secured while an amount of the resin for the tank body is suppressed from increasing. In addition, the projection is formed hollow. Thus, for example, compared to a projection that is not hollow, the amount of the resin for the tank body can be suppressed from increasing.

The fuel tank has such a superior effect that the strength of the attachment section that is used to attach the attachment part can be secured while the amount of the resin is suppressed from increasing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
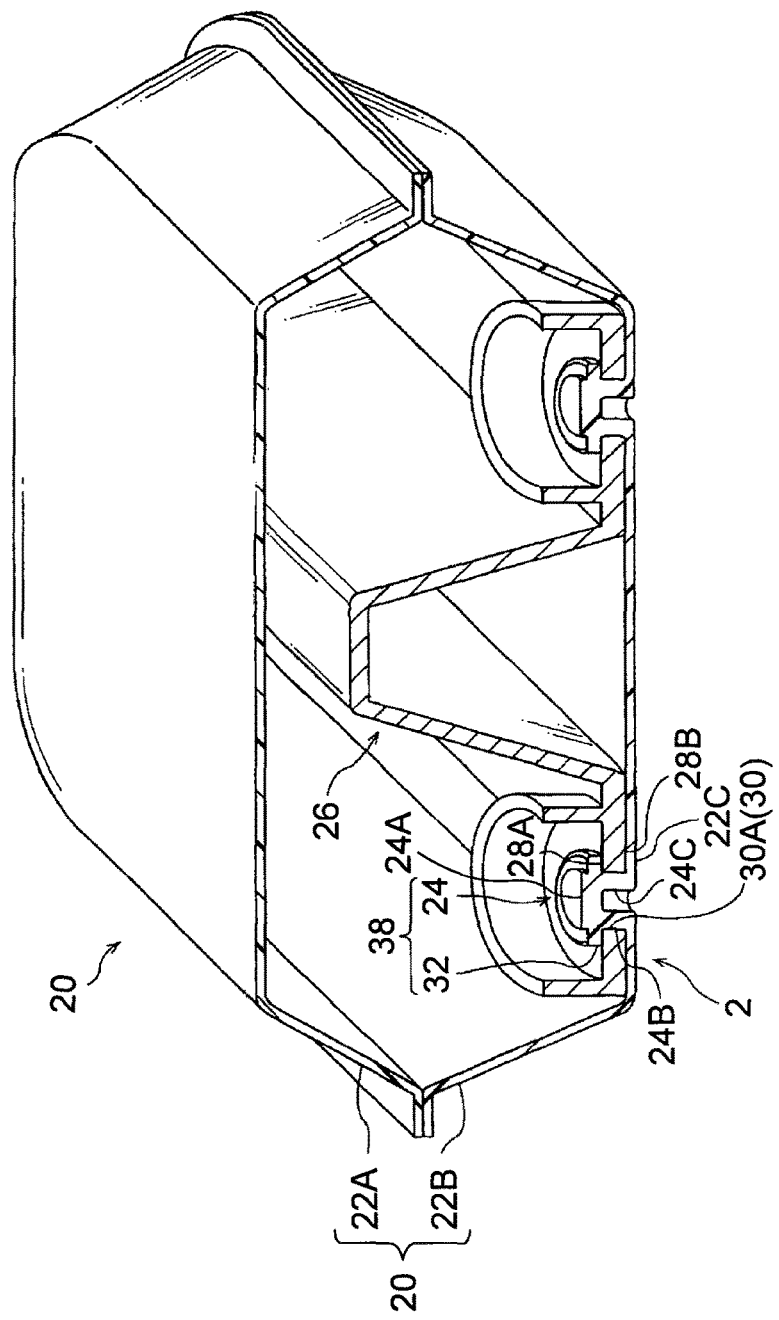
FIG. 1 is a perspective view of a cross section of a fuel tank according to one embodiment of the present invention.

A description will hereinafter be made on an embodiment of a method of manufacturing a fuel tank and a fuel tank according to the present invention. FIG. 1 shows a fuel tank 20 of this embodiment. This fuel tank 20 is a fuel tank installed in a vehicle. The fuel tank 20 includes a box-shaped tank body 22 that can store fuel therein.

The tank body 22 is formed of a resin. More specifically, the tank body 22 is configured by including a resin layer and a barrier layer, fuel permeability of which is lower (the fuel is less likely to permeate) than this resin layer. As the resin for constituting the resin layer, for example, high-density polyethylene (HDPE) may be used. As a material for forming the barrier layer, ethylene-vinyl alcohol (EVOH) may be used.

Although the tank body 22 is formed with an opening for connecting a pipe, the opening is not shown.

The tank body 22 is formed in a box shape by joining (welding) outer peripheral edges of two tank bodies 22A, 22B that are divided vertically. Here, the tank body 22A is projected upward as a whole (a state shown in FIG. 1), and the tank body 22B is projected downward as a whole (a state shown in FIG. 1).

Figure 2:
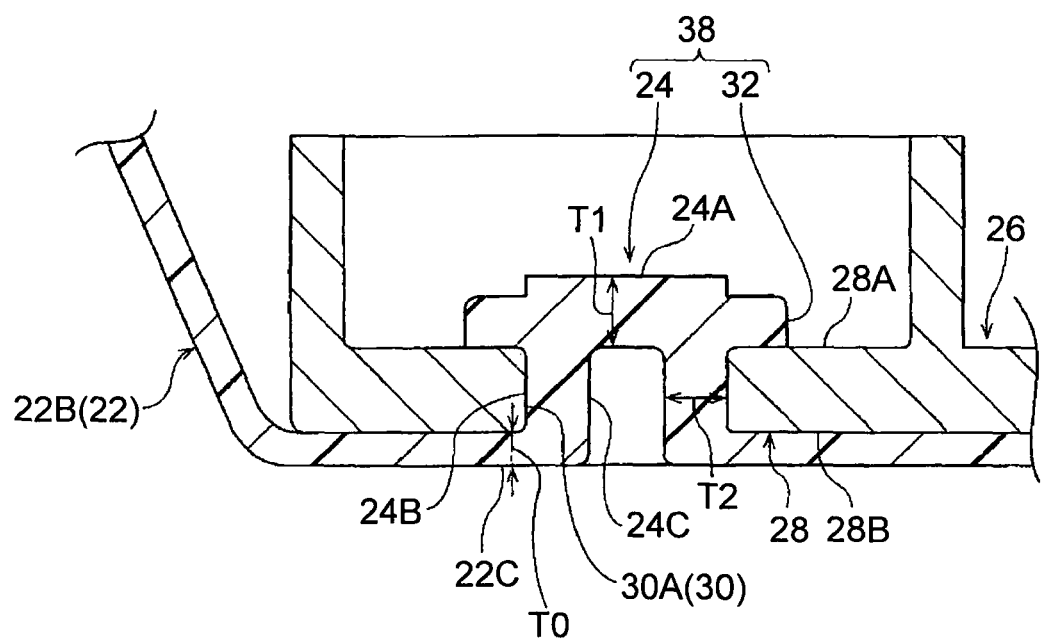
FIG. 2 is an enlarged view of a portion indicated by an arrow 2 in FIG. 1.

As shown in FIG. 1 and FIG. 2, a projection 24, which is projected in a thickness direction (a plate thickness direction), is formed in a bottom of the tank body 22 (the tank body 22B). More specifically, the projection 24 is projected to the inside of the tank body 22. This projection 24 is formed in a cylindrical shape that is hollow and a top 24A of which is closed.

As shown in FIG. 2, the projection 24 is inserted in an attachment hole 30 that is formed in a plate-shaped fastening seat 28 of an attachment part 26 (a built-in part), the attachment part 26 being attached to the inside of the fuel tank 20. An outer peripheral surface 24B of the projection 24 is in close contact with a hole wall surface 30A of the attachment hole 30. Here, for example, another built-in part of the fuel tank 20 is attached to the attachment part 26 either directly or indirectly via another member.

A thickness T1 of the top 24A of the projection 24 and a thickness T2 of a portion of the projection 24 that is inserted in the attachment hole 30 (hereinafter described as an "inserted section 24C") are set to be at least equal to a thickness T0 of a general section 22C of the tank body 22.

The top 24A side of the projection 24 is formed with a bulge 32 that bulges in a direction that is orthogonal to a projecting direction (same as a radial direction of the projection 24). This bulge 32 is formed for a whole periphery along the outer periphery of the projection 24, and holds the fastening seat 28 between the bulge 32 and the general section 22C. More specifically, the bulge 32 is in close contact with one surface 28A (an upper surface in FIG. 2) of the fastening seat 28, and the general section 22C is in close contact with another surface 28B (a lower surface in FIG. 2). Accordingly, the fastening seat 28 is held and fixed (fastened) between the bulge 32 and the general section 22C. In other words, the fastening seat 28 is caulked by the bulge 32 and the general section 22C.

Figure 3:
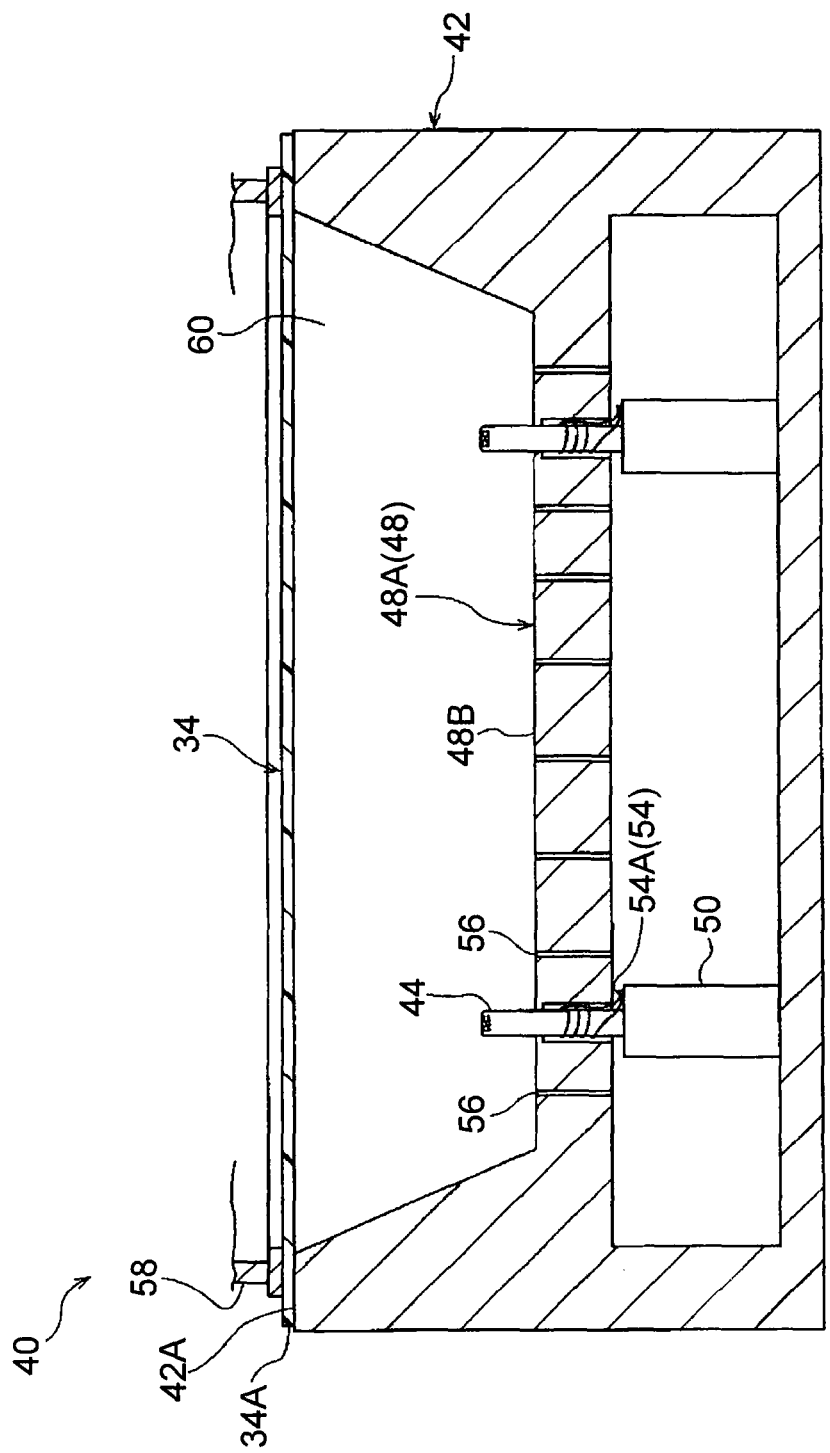
FIG. 3 is a cross-sectional view of a molten resin sheet in a state that the molten resin sheet, of which a tank body is formed, is introduced in a forming mold.
Figure 6:
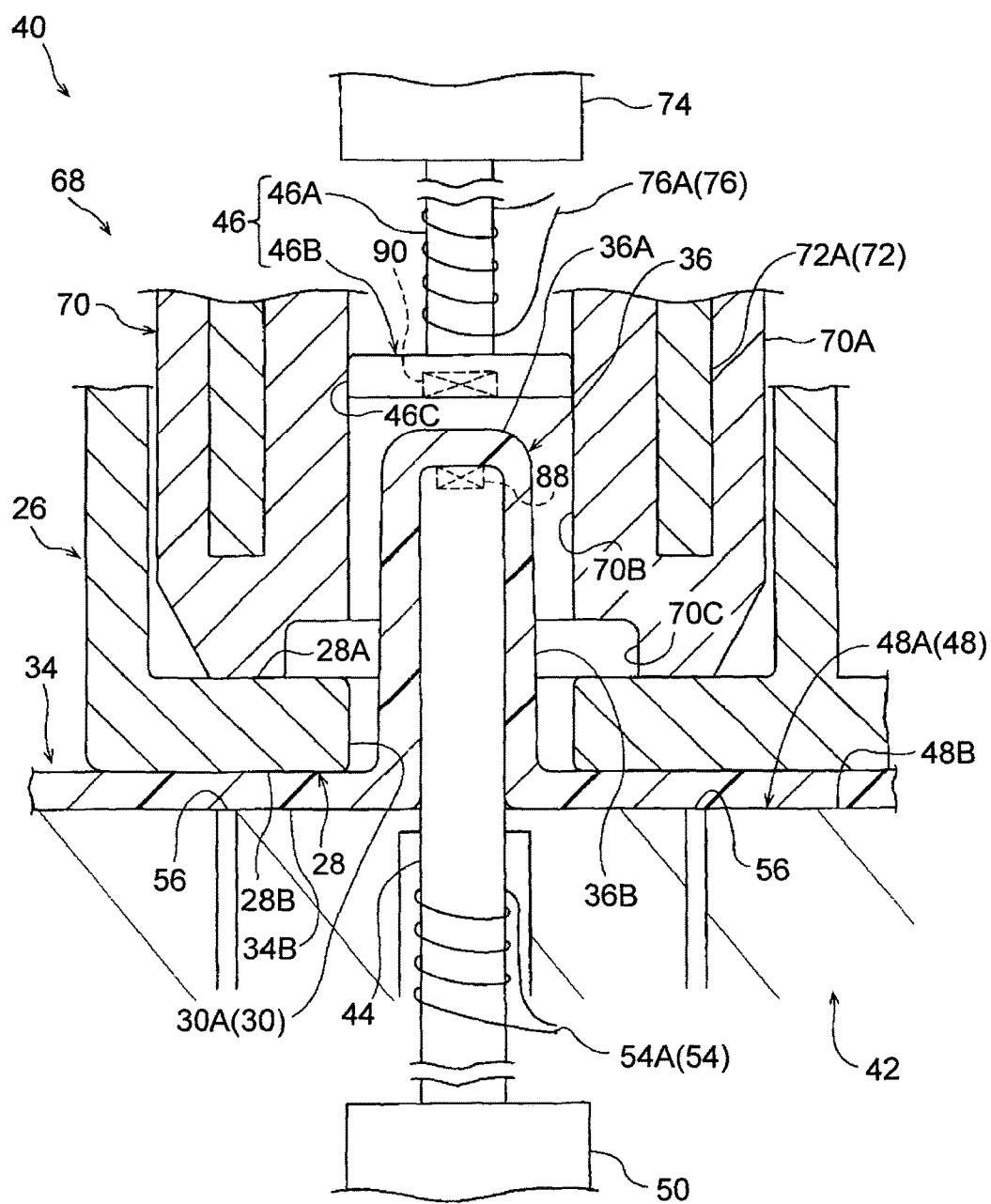
FIG. 6 is an enlarged view of a portion indicated by an arrow 6 in FIG. 5, and shows a state that an attachment part and a cylindrical mold are arranged on a molten resin projection of the molten resin sheet.
Figure 10:
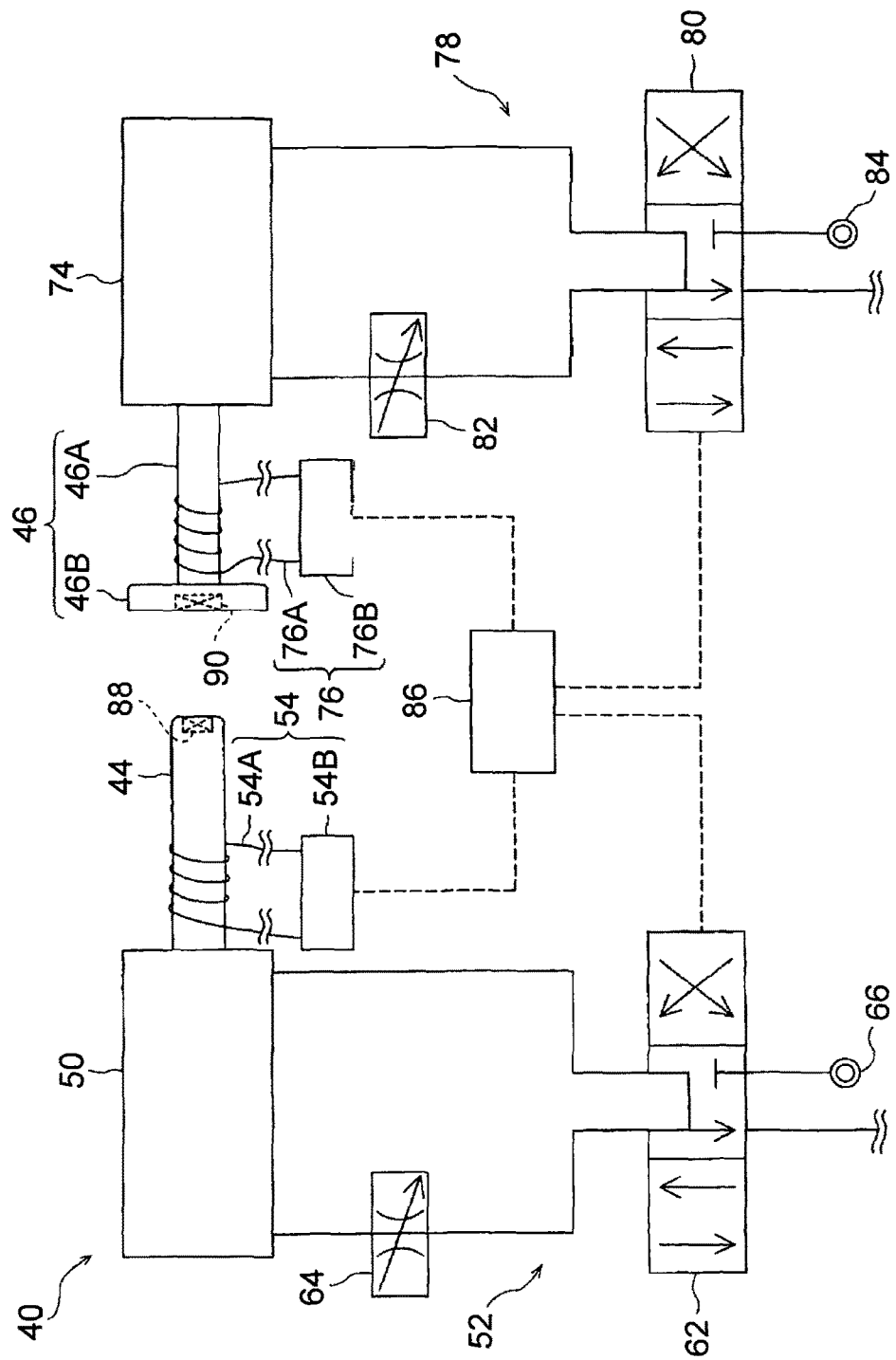
FIG. 10 is a circuit diagram for schematically showing a pneumatic circuit and an electric circuit of a forming device.

Next, a forming device 40 for forming the tank body 22B of the fuel tank 20 of this embodiment will be described. As shown in FIG. 3, FIG. 6, and FIG. 10, the forming device 40 includes various components such as a forming mold 42, a movable member 44, and a pressurizing member 46.

As shown in FIG. 3, the forming mold 42 is a mold for forming a sheet-like molten resin (hereinafter described as a "molten resin sheet 34") into the tank body 22B, and includes a cavity 48 that conforms to a shape of the tank body 22B.

The movable member 44 and an actuator 50 to make the movable member 44 movable (move) are arranged in the forming mold 42.

The movable member 44 is a substantially cylindrical metal rod, and is configured to be movable by the actuator 50 in a direction orthogonal to a bottom 48B of a cavity surface 48A. The actuator 50 is configured to move the movable member 44, so as to allow the movable member 44 to be projected from the cavity surface 48A or to be housed in the forming mold 42.

As an example, a double-action air cylinder is used as the actuator 50 of this embodiment. An actuation circuit 52 (see FIG. 10) for actuating this actuator 50 will be described below. In addition, in this embodiment, the movable member 44 is connected to a reciprocating portion of the air cylinder. It should be noted that, although the air cylinder is used as the actuator 50 in this embodiment, the present invention is not limited to this configuration. For example, a hydraulic cylinder, a servomotor, or the like may be used. When the servomotor is used, it is possible to increase accuracy in a projection height of the movable member 44 from the cavity surface 48A. In addition, a moving speed of the movable member 44 can be adjusted accurately.

The movable member 44 is heated by a heater 54. The heater 54 of this embodiment is configured by including a heating wire 54A that is wound around an outer periphery of the movable member 44 and a power supply source 54B (see FIG. 10). Instead of a configuration in which the heating wire 54A is wound around the outer periphery of the movable member 44, a configuration may be adopted in which a rod-shaped electrically heated member (a member formed of an electrically heated material) is embedded in the movable member 44.

As shown in FIG. 3, the forming mold 42 is provided with a gas flow passage 56 that runs through the forming mold 42 and opens to the cavity surface 48A. This gas flow passage 56 is connected to a pneumatic circuit, which is not shown. This pneumatic circuit is configured to be connected to a pressurized gas generation device (not shown) and a negative pressure generation device (not shown) and either to be able to supply pressurized gas to an area around the cavity 48 through the gas flow passage 56 or to be able to suction gas in the area around the cavity 48. In this embodiment, a positive pressure pump and a negative pressure pump are respectively used as an example of the pressurized gas generation device and as an example of the negative pressure generation device.

An outer peripheral edge 34A of the molten resin sheet 34, which is introduced in the forming mold 42, is pressed against a peripheral section 42A of the cavity surface 48A of the forming mold 42 by a pressing machine 58. This pressing machine 58 is configured to press the entire outer peripheral edge 34A of the molten resin sheet 34 against the peripheral section 42A of the forming mold 42. When this pressing machine 58 is used to set (arrange) the molten resin sheet 34 in the forming mold 42, a sealed space 60 is formed between the molten resin sheet 34 and the cavity surface 48A. Here, it is possible by using the above-described pneumatic circuit to either supply the pressurized gas (pressurized air in this embodiment) into the sealed space 60 to pressurize the sealed space 60 or suction the gas from the sealed space 60 to depressurize the sealed space 60.

As shown in FIG. 10, an electromagnetic valve 62 is provided in the actuation circuit 52 of the actuator 50. The movable member 44 can be switched among a pushed-out state, a pulled-in state, and a neutral state by switching this electromagnetic valve 62. A throttle valve 64 is provided in a pull-in side circuit for pulling in the movable member 44. Here, a gas supply source (compressor) 66 is connected to the actuation circuit 52.

As shown in FIG. 6, a machining device 68 is provided to face the forming mold 42. This machining device 68 is configured to be movable in a direction orthogonal to the bottom of the cavity surface 48A and to enable evacuation from the forming mold 42.

The machining device 68 includes a cylindrical mold 70 that houses a molten resin projection 36, which will be described below. The molten resin projection 36 is formed in the same shape as an inner periphery of the cylindrical mold 70 when being pressurized. In addition, an electrically heated member 72A for heating the cylindrical mold 70 is installed in a peripheral wall 70A of the cylindrical mold 70. This electrically heated member 72A is connected to a power supply source, which is not shown, and constitutes a heater 72.

The pressurizing member 46 is arranged in the cylindrical mold 70. This pressurizing member 46 is configured by including a metal rod 46A in a substantially cylindrical shape and a disc 46B that is made of metal and provided at a tip of this metal rod 46A. An outer peripheral surface 46C of this disc 46B is in contact with an inner peripheral surface 70B of the cylindrical mold 70.

The pressurizing member 46 is configured to be movable along an axial direction of the cylindrical mold 70 by an actuator 74. The cylindrical mold 70 is set up in the machining device 68 in such a manner that the axial direction thereof corresponds to a moving direction of the movable member 44.

A double-action air cylinder is used as an example of the actuator 74 of this embodiment. An actuation circuit 78 (see FIG. 10) for actuating this actuator 74 will be described below. In this embodiment, the pressurizing member 46 is connected to a reciprocating portion of the air cylinder. It should be noted that, although the air cylinder is used as the actuator 74 in this embodiment, the present invention is not limited to this configuration. For example, a hydraulic cylinder, a servomotor, or the like may be used. When the servomotor is used, it is possible to increase positioning accuracy of the pressurizing member 46 in the cylindrical mold 70. In addition, a moving speed of the pressurizing member 46 can be adjusted accurately.

The pressurizing member 46 is heated by a heater 76. The heater 76 of this embodiment is configured by including a heating wire 76A that is wound around an outer periphery of the metal rod 46A and a power supply source 76B (see FIG. 10). The heat of this heating wire 76A is transmitted to the disc 46B via the metal rod 46A. Here, instead of a configuration in which the heating wire 76A is wound around the outer periphery of the pressurizing member 46, a configuration may be adopted in which a rod-shaped electrically heated member (a member formed of the electrically heated material) is embedded in the pressurizing member 46.

As shown in FIG. 10, an electromagnetic valve 80 is provided in the actuation circuit 78 of the actuator 74. The pressurizing member 46 can be switched among a pushed-out state, a pulled-in state, and a neutral state by switching this electromagnetic valve 80. In addition, a throttle valve 82 is provided in a pushing-out side circuit for pushing out the pressurizing member 46. Here, a gas supply source (compressor) 84 is connected to the actuation circuit 78. The same gas supply source may be connected to the actuation circuit 52 and the actuation circuit 78.

A forming section 70C, an inner diameter of which is larger than the disc 46B of the pressurizing member 46, is formed on a tip side (the forming mold 42 side) in the cylindrical mold 70. The bulge 32 that bulges from the projection 24 of the tank body 22B is formed by this forming section 70C. Here, the pressurizing member 46 is adjusted such that the disc 46B can move to the vicinity of the forming section 70C in the cylindrical mold 70.

As shown in FIG. 10, the forming device 40 includes a control unit 86 for controlling electrical equipment used in the forming device 40. This control unit 86 controls, as an example, switching of the electromagnetic valve 62 and the electromagnetic valve 80 and activation of the heater 54, the heater 72, and the heater 76.

Figure 7:
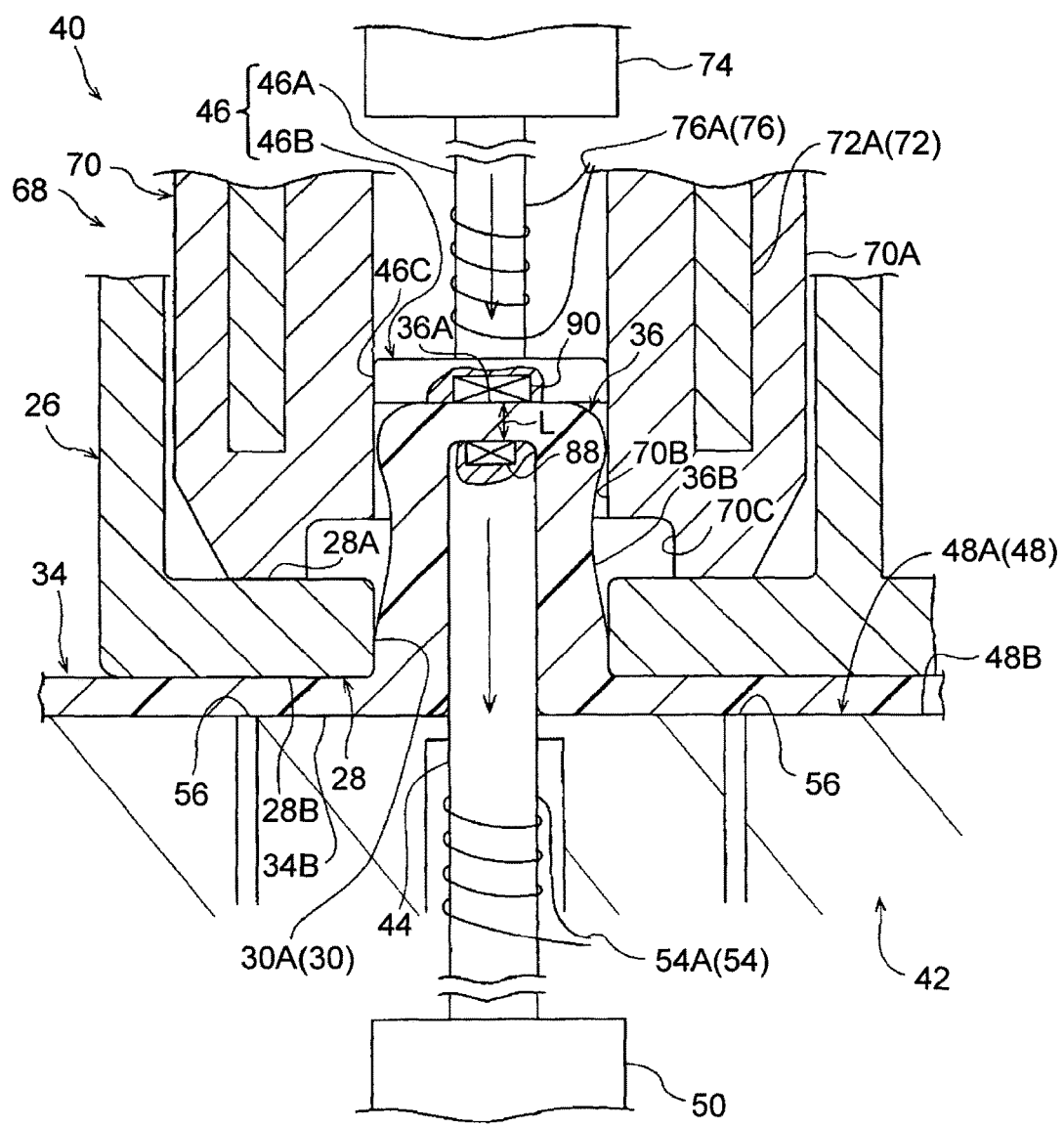
FIG. 7 is a cross-sectional view of the molten resin projection in a state that the molten resin projection in FIG. 6 is pressurized and deformed by a pressurizing member.

As shown in FIG. 7, a magnet 88 is embedded in the tip of the movable member 44. Meanwhile, a magnet 90 is embedded in the disc 46B of the pressurizing member 46. The magnet 88 and the magnet 90 are arranged in a direction to generate a repulsive force therebetween.

In the forming device 40 of this embodiment, the movable member 44 also has a function as an ejector pin that ejects the tank body 22B from the forming mold 42.

Next, a method of manufacturing the fuel tank 20 of this embodiment will be described.

(Introducing Process) First, the molten resin sheet 34, of which the tank body 22B of the fuel tank 20 is formed, is manufactured. This molten resin sheet 34 is introduced in the forming mold 42 of the forming device 40. Then, as shown in FIG. 3, the pressing machine 58 presses the outer peripheral edge 34A of the molten resin sheet 34 against the peripheral section 42A of the forming mold 42, and sets the molten resin sheet 34 in the forming mold 42.

Figure 4:
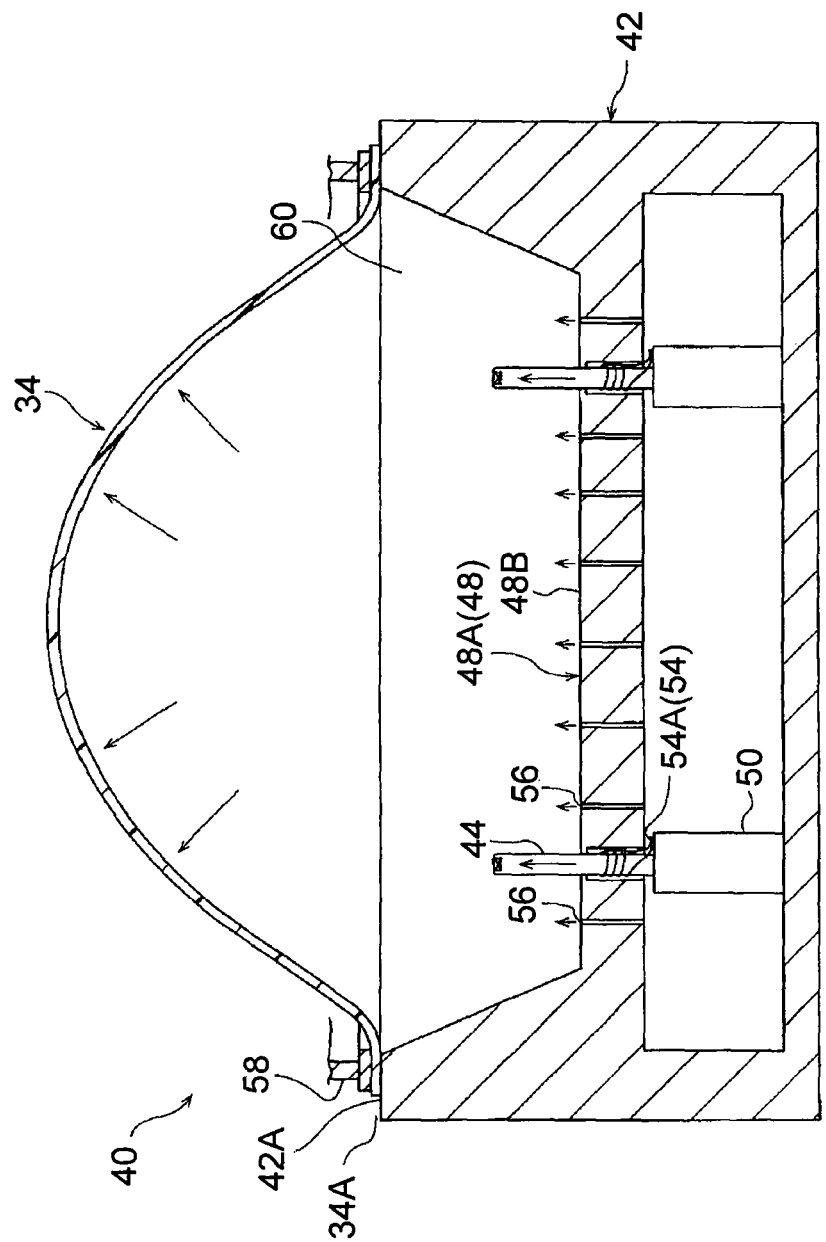
FIG. 4 is a cross-sectional view of the molten resin sheet in a state that the molten resin sheet in FIG. 3 is blown up.

(Shaping Process) Next, as shown in FIG. 4, the gas is supplied from the pneumatic circuit to the sealed space 60, which is formed between the molten resin sheet 34 and the cavity surface 48A, through the gas flow passage 56. Then, the sealed space 60 is pressurized to blow up and stretch the molten resin sheet 34 in a balloon shape. This allows a thickness of the molten resin sheet 34 to be even. In addition, the pressure in the sealed space 60 is adjusted such that an extra length of the molten resin sheet 34 can be secured with respect to the cavity surface 48A, and the molten resin sheet 34 is stretched. It is preferable to secure the extra length of the molten resin sheet 34 that is sufficient for an amount of the resin required for the molten resin projection 36, which will be described below.

While the molten resin sheet 34 is stretched, the projection height of the movable member 44 from the cavity surface 48A is adjusted.

Figure 5:
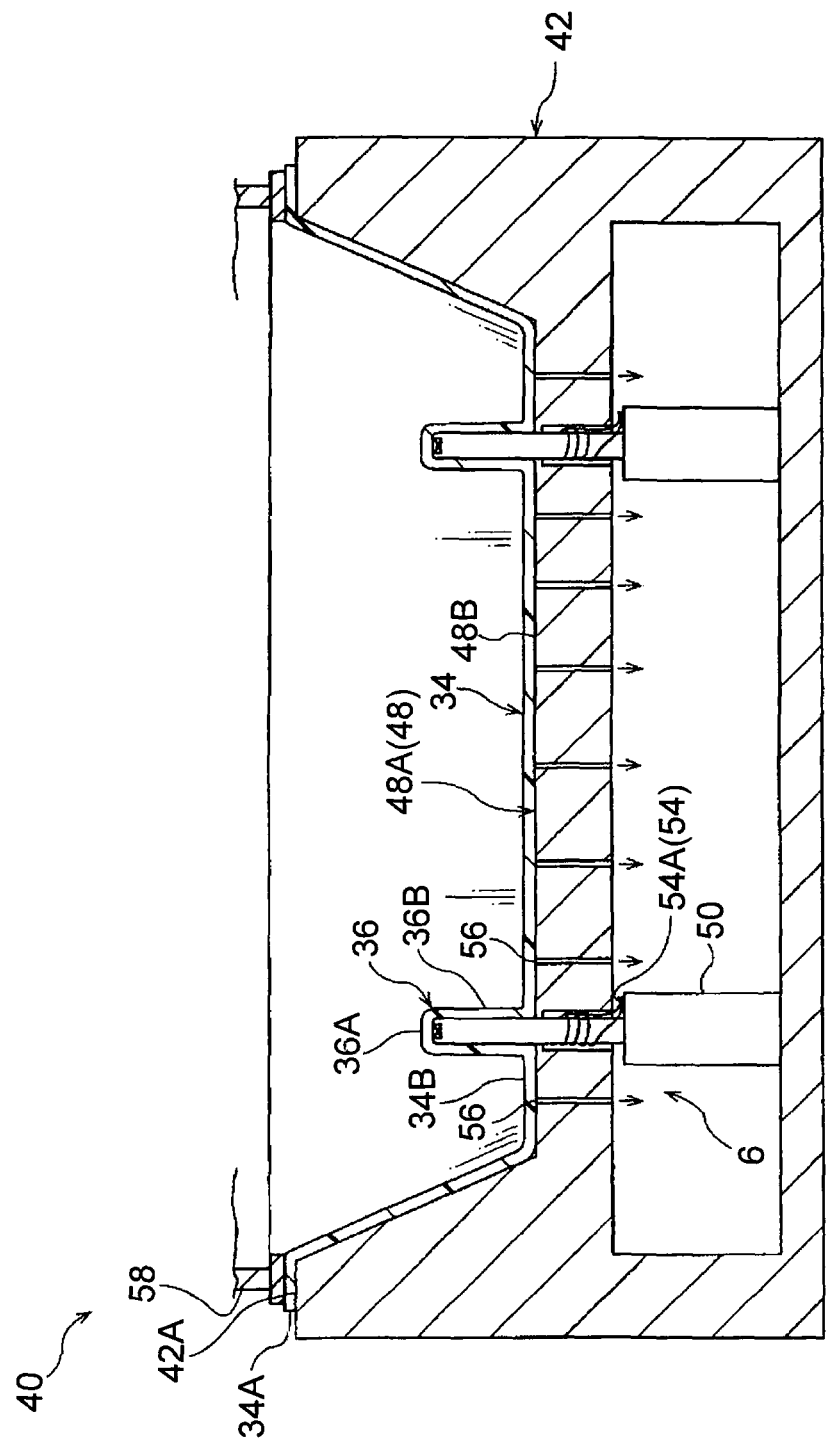
FIG. 5 is a cross-sectional view of the molten resin sheet in a state that the molten resin sheet in FIG. 4 is arranged on a cavity surface of the forming mold.

Then, after the extra length of the molten resin sheet 34 is secured, as shown in FIG. 5, the air is suctioned from the sealed space 60 through the gas flow passage 56 to depressurize the sealed space 60. This brings the molten resin sheet 34 into close contact with the cavity surface 48A. Accordingly, the molten resin sheet 34 is arranged along the cavity surface 48A. At this time, since the movable member 44 is projected from the cavity surface 48A, a portion of the molten resin sheet 34 that abuts against the movable member 44 is projected in the thickness direction of the molten resin sheet 34 to form the molten resin projection 36. The extra length of the molten resin sheet 34 is concentrated around the movable member 44 to form the molten resin projection 36. Accordingly, the molten resin sheet 34 is shaped into the tank body 22B.

(Arrangement Process) Next, as shown in FIG. 6, the molten resin projection 36 is inserted in the attachment hole 30, which is formed in the fastening seat 28 of the attachment part 26, and the fastening seat 28 is arranged on the molten resin sheet 34.

(Machining Process) Next, as shown in FIG. 7, while the movable member 44 moves in an opposite direction from the projecting direction of the molten resin projection 36 (in a direction to house the movable member 44 in the forming mold 42), the pressurizing member 46 pressurizes the molten resin projection 36 in the opposite direction from the projecting direction for deformation. More specifically, in this embodiment, the electromagnetic valve 62 is switched to the neutral (exhaust) state, the pressurizing member 46 moves to the forming mold 42 side at a low speed under a low load (the throttle valve 82 generates a low-speed, low-load state), and the movable member 44 is pressed to move via the molten resin projection 36, so as to pressurize and deform the molten resin projection 36. In other words, once the pressurizing member 46 abuts against the molten resin projection 36, the pressed movable member 44 starts moving in the opposite direction from the projecting direction of the molten resin projection 36. At this time, a clearance L between the movable member 44 and the pressurizing member 46 can be kept constant by the repulsive force generated between the magnet 88 and the magnet 90.

In the machining process, the control unit 86 activates the heater 54, the heater 72, and the heater 76. Instead, the heater 54 may be activated in the shaping process and the machining process.

Figure 8:
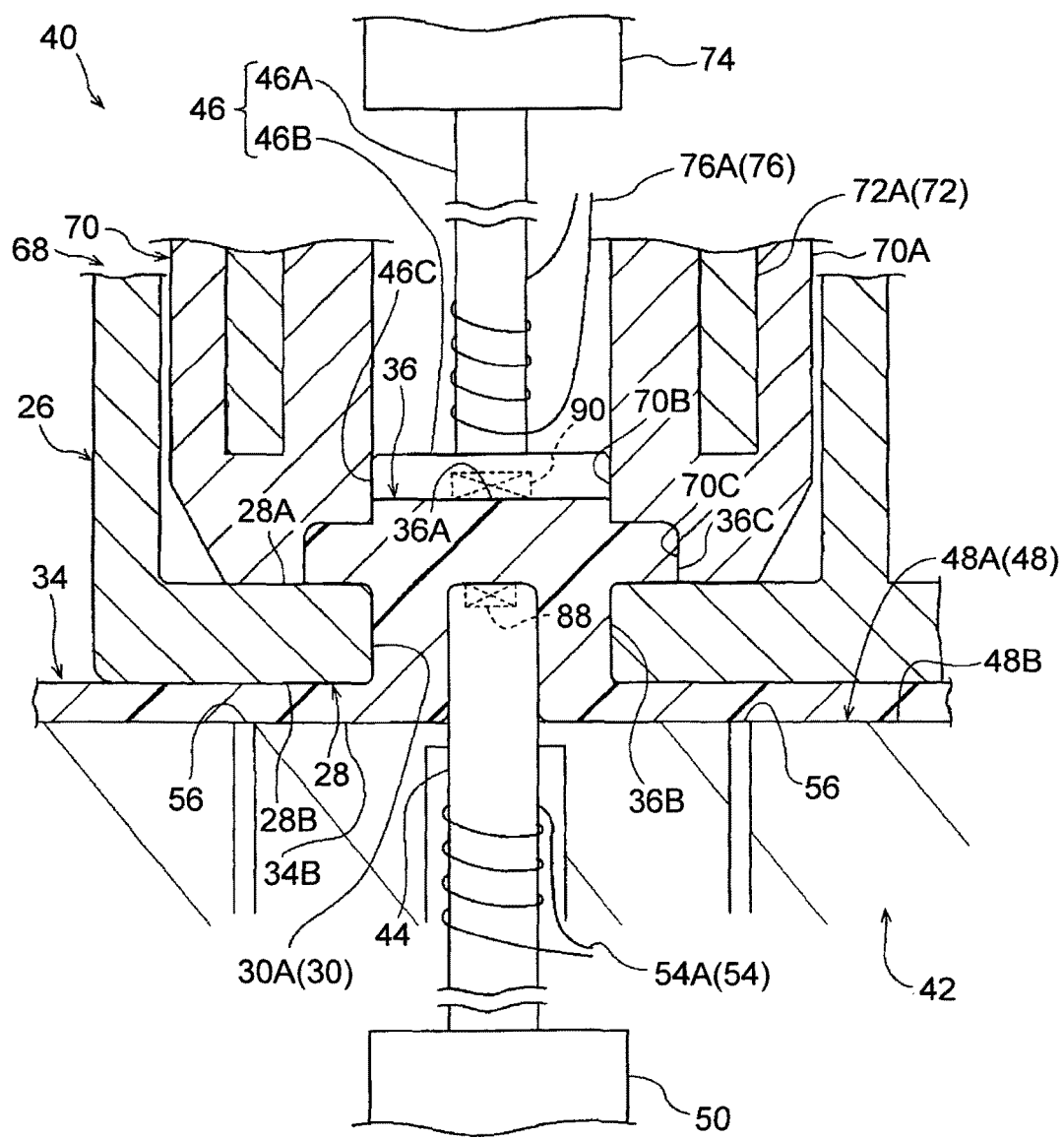
FIG. 8 is a cross-sectional view of the molten resin projection in a state that a bulge is formed as a result of deformation of the molten resin projection in FIG. 7, which is caused by pressurization.

As shown in FIG. 8, in the molten resin projection 36, which has been pressurized by the pressurizing member 46, a portion of a peripheral wall 36B bulges out to the outer peripheral side and enters a space, between the forming section 70C of the cylindrical mold 70 and the fastening seat 28, and a bulge 36C that bulges out to the outer peripheral side is formed in the molten resin projection 36. In addition, due to the pressurization from the pressurizing member 46, the molten resin, of which the molten resin projection 36 is formed, enters the space between the forming section 70C of the cylindrical mold 70 and the fastening seat 28 as well as a gap between the molten resin projection 36 and the hole wall surface 30A of the attachment hole 30. Accordingly, the bulge 36C is brought into close contact with the one surface 28A of the fastening seat 28, and the molten resin sheet 34 is brought into close contact with the other surface 28B of the fastening seat 28. Furthermore, the molten resin projection 36 is brought into close contact with the hole wall surface 30A. As a result, the fastening seat 28 of the attachment part 26 is held between the bulge 36C and a general section 34B of the molten resin sheet 34. The general section 34B of this embodiment refers to a portion of the molten resin sheet 34 that contacts the fastening seat 28.

Figure 9:
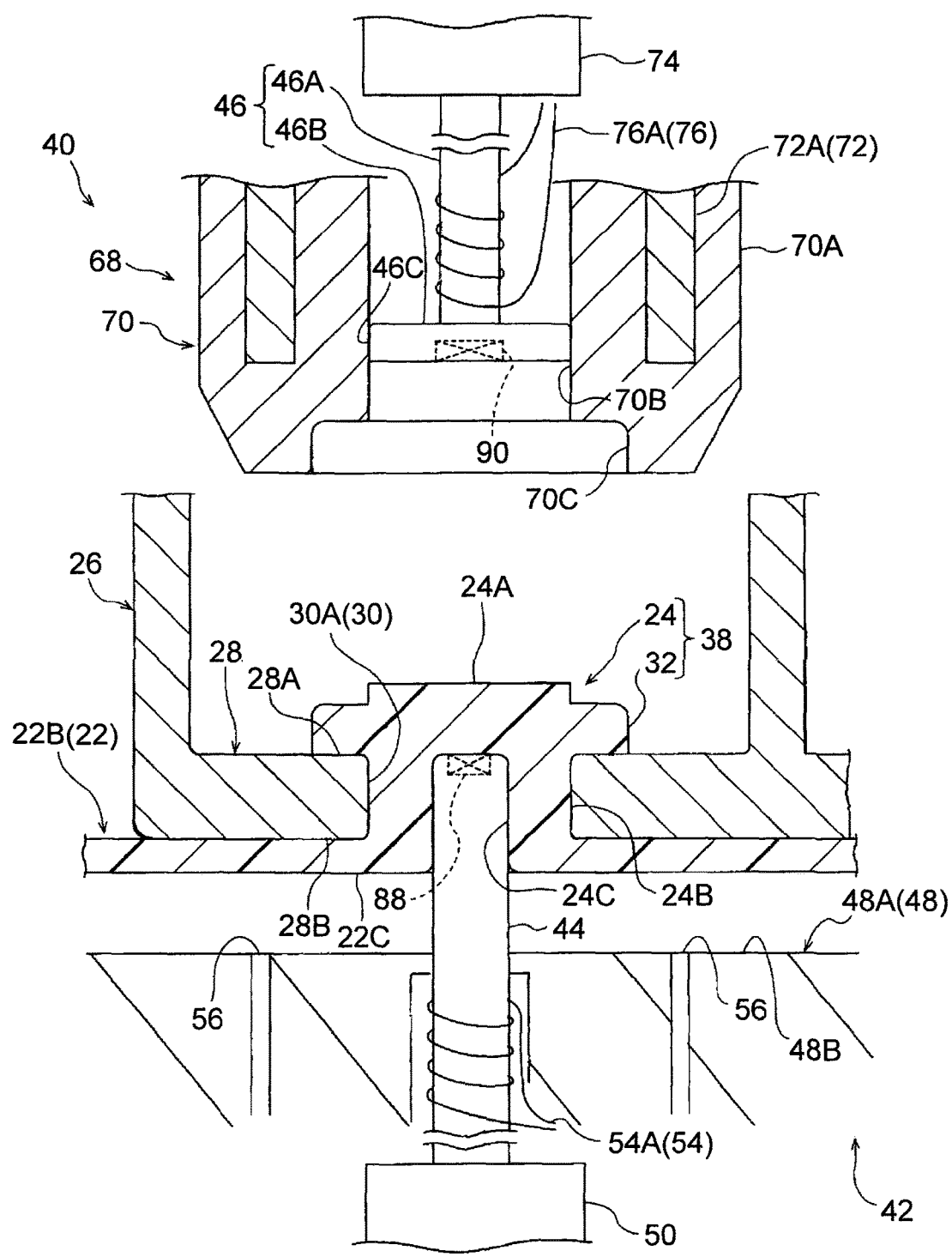
FIG. 9 is a cross-sectional view of the projection in a state that a tank body is ejected from the forming mold.

Then, the heater 54, the heater 72, and the heater 76 are stopped, and the molten resin is cooled and hardened while the fastening seat 28 is held between the bulge 36C and the general section 34B of the molten resin sheet 34. Accordingly, as shown in FIG. 9, the tank body 22B is formed with an attachment section 38 (the projection 24 and the bulge 32) that is used to attach the attachment part to the fuel tank. The attachment part 26 is fixed (fastened) to the tank body 22B by this attachment section 38.

Next, the movable member 44 is projected to eject the tank body 22B from the forming mold 42. Then, the outer peripheral edge of the tank body 22A, which is formed by using an unillustrated forming mold, and the outer peripheral edge of the tank body 22B are stacked and joined (welded) to finish the tank body 22.

Next, effects of the fuel tank 20 and the method of manufacturing the fuel tank 20 of this embodiment will be described.

In the machining process, while the movable member 44 moves in the opposite direction from the projecting direction of the molten resin projection 36, the pressurizing member 46 pressurizes the molten resin projection 36 in the opposite direction from the projecting direction. Accordingly, even when the pressurizing member 46 is actuated at the low speed under the low load, the molten resin projection 36 is less likely to be in an odd shape. Thus, the pressurizing member 46 can be actuated at the low speed under the low load. Here, when the pressurizing member 46 is actuated at the low speed under the low load, the portion of the molten resin, of which the molten resin projection 36 is formed, can be suppressed from being pushed back to the molten resin sheet 34, and it is thereby possible to secure the amount of the resin that is required to form the attachment section 38 of the tank body 22 (the fuel tank 20). Accordingly, the strength of the attachment section 38 of the fuel tank 20 is secured. Especially, since the portion of the molten resin, of which the molten resin projection 36 is formed, can be suppressed from being pushed back to the molten resin sheet 34 during the pressurization, the attachment section 38 can be formed while the strength is secured in a portion where it is difficult to secure the molten resin, such as the vicinity of a lateral surface of the tank body 22B. In addition, when the pressurizing member 46 is actuated at the low speed under the low load, there is no need to thicken the molten resin sheet 34 in order to secure the amount of the resin that is required to form the attachment section 38 of the fuel tank 20. Thus, the amount of the resin for the tank body 22 can be suppressed from increasing. Furthermore, during the pressurization of the molten resin projection 36, since the molten resin projection 36 is pressurized and deformed while being supported by the movable member 44, a portion of the peripheral wall 36B is not double-folded but bulges out to the outer peripheral side to form the bulge 36C. Accordingly, since a fused surface, which is produced when the portion of the peripheral wall 36B is double-folded, is not produced in the bulge 36C, it is possible to secure the strength of the bulge 32 of the attachment section 38. In other words, since the fused surface is not produced in the bulge 32 of the attachment section 38 as described above, stress concentration on the fused surface can be suppressed.

The movable member 44 and the pressurizing member 46 move while keeping a constant clearance therebetween during the pressurization of the molten resin projection 36. Thus, the molten resin projection 36 can stably be deformed to a specified shape.

In addition, once the pressurizing member 46 abuts against the molten resin projection 36, the movable member 44 starts moving in the opposite direction from the projecting direction of the molten resin projection 36. Thus, the top 36A of the molten resin projection 36 can be suppressed from becoming extremely thin.

In the shaping process, since the molten resin sheet 34 is arranged along the cavity surface 48A in the state that the movable member 44 is projected from the bottom of the cavity surface 48A of the forming mold 42, the molten resin projection 36 is pressurized on the cavity surface 48A. Thus, the molten resin projection 36 can stably be deformed in the specified shape. Therefore, the attachment part 26 can stably be attached to the fuel tank 20.

In addition, since the molten resin sheet 34 is arranged along (brought into close contact with) the cavity surface 48A due to the depressurization of the sealed space 60, it is possible to suppress complication of a manufacturing process or complication and enlargement of a manufacturing device.

Furthermore, after the molten resin sheet 34 is stretched and the extra length is secured with respect to the cavity surface 48A, the molten resin sheet 34 is arranged along the cavity surface 48A. Thus, it is possible to prevent a locally thin section from being produced in the molten resin sheet 34 when the molten resin projection 36 is formed. Here, to secure the extra length with respect to the cavity surface 48A means that an area of a formed surface of the molten resin sheet 34 is increased with respect to an area of the cavity surface 48A to form an extra portion.

In the fuel tank 20 that is manufactured in the above method of manufacturing, the thickness T1 of the top 24A of the projection 24 and the thickness T2 of the inserted section 24C are set to be at least equal to the thickness T0 of the general, section 22C of the tank body 22. Thus, it is possible to suppress the amount of the resin for the tank body 22 from increasing while securing the strength of the attachment section 38 (the projection 24 and the bulge 32). In addition, since the projection 24 is formed hollow, the amount of the resin for the tank body 22 is further suppressed from increasing. Therefore, a weight of the fuel tank 20 can be reduced.

In the method of manufacturing in the above-described embodiment, in the shaping process, the molten resin sheet 34 is arranged along the cavity surface 48A in the state that the movable member 44 is projected from the cavity surface 48A of the forming mold 42, and the molten resin projection 36 is formed. However, the present invention is not limited to this configuration. For example, the movable member 44 may be projected from the cavity surface 48A after the molten resin sheet 34 is arranged along the cavity surface 48A of the forming mold 42, and the molten resin projection 36 may be formed.

In the method of manufacturing in the above-described embodiment, in the shaping process, since the sealed space 60 is pressurized to blow up and stretch the molten resin sheet 34 in the balloon shape, the molten resin sheet 34 secures the extra length with respect to the cavity surface 48A. However, the present invention is not limited to this configuration. For example, in the introducing process, the molten resin sheet 34, the extra length of which with respect to the cavity surface 48A has been secured, may be extruded by an extruder and then introduced in the forming mold 42. When this configuration is adopted, there is no need to blow up and stretch the molten resin sheet 34 in the balloon shape.

Figure 11:
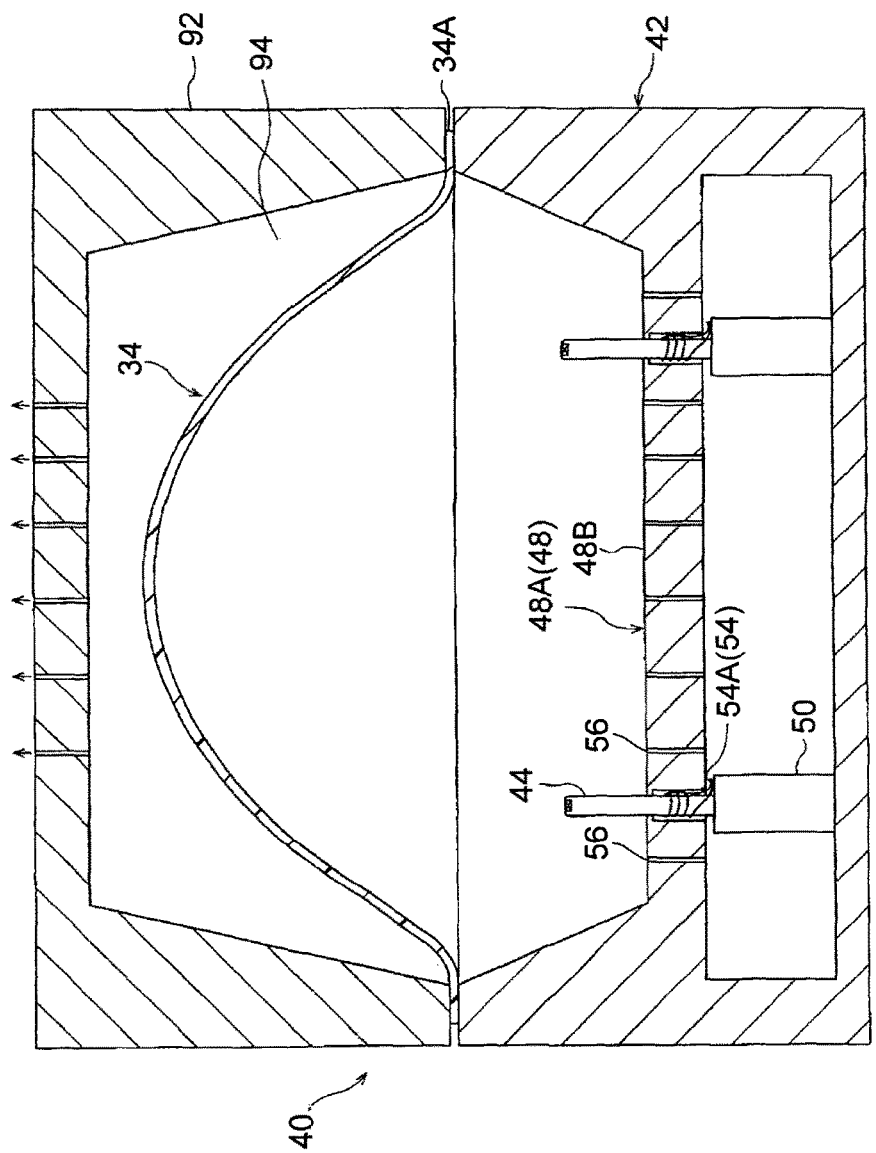
FIG. 11 is a cross-sectional view of the molten resin sheet in a state that the molten resin sheet, of which the tank body is formed, is introduced between the forming mold and a pressure forming mold and blown up.
Figure 12:
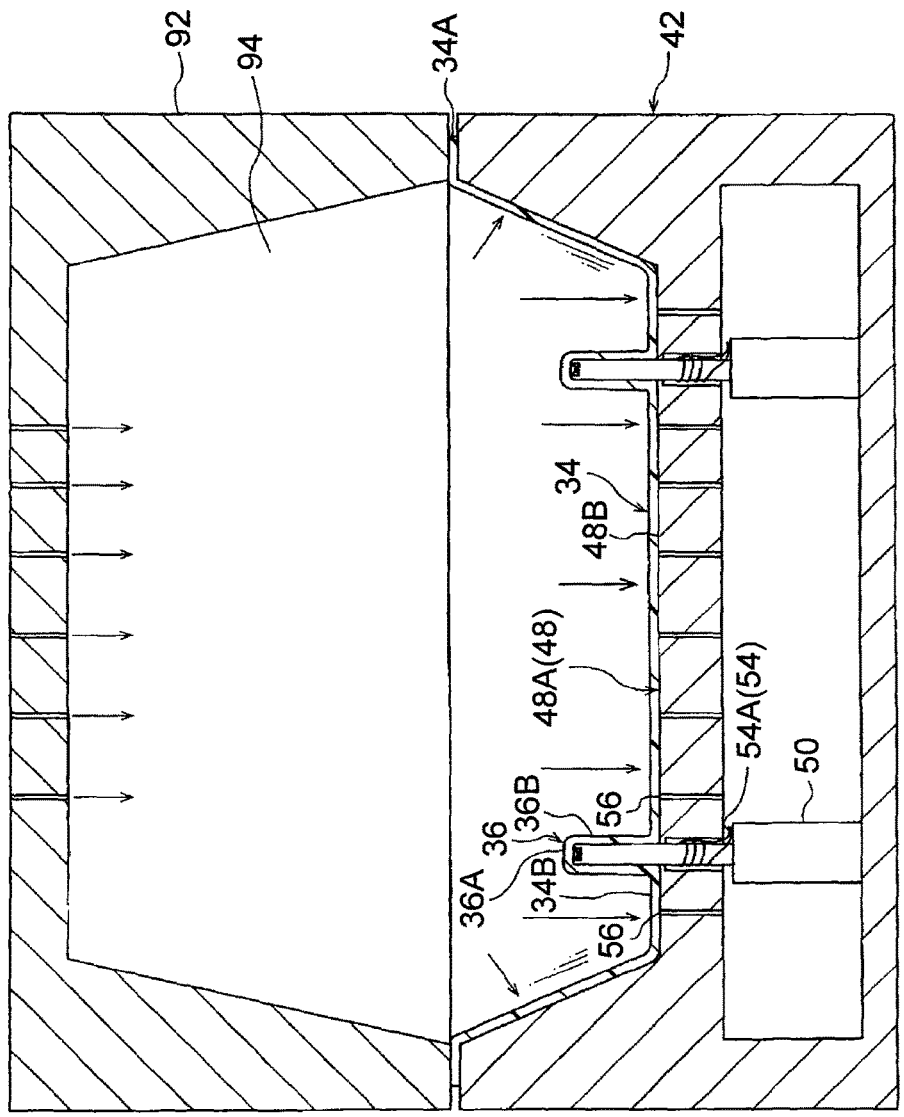
FIG. 12 is a cross-sectional view of the molten resin sheet in a state that the molten resin sheet in FIG. 11 is arranged on the cavity surface of the forming mold.

In the method of manufacturing in the above-described embodiment, in the shaping process, the molten resin sheet 34 is stretched due to the pressurization of the sealed space 60, and the molten resin sheet 34 is arranged along the cavity surface 48A due to the depressurization of the sealed space 60. However, the present invention is not limited to this configuration. As shown in FIG. 11 and FIG. 12, a configuration may be adopted in which a pressure forming mold 92 is arranged to be mated with the forming mold 42, a sealed space 94 is formed between the pressure forming mold 92 and the molten resin sheet 34, and this sealed space 94 is pressurized or depressurized either to stretch the molten resin sheet 34 or to arrange (closely contact) the stretched molten resin sheet 34 along (with) the cavity surface 48A.

In the method of manufacturing in the above-described embodiment, in the machining process, it is configured that, once the pressurizing member 46 abuts against the molten resin projection 36, the pressed movable member 44 starts moving in the opposite direction from the projecting direction of the molten resin projection 36. However, the present invention is not limited to this configuration. For example, a configuration may be adopted in which, when the clearance L between the movable member 44 and the pressurizing member 46 becomes a predetermined value during the movement of the pressurizing member 46, the movable member 44 starts moving in the opposite direction from the projecting direction of the molten resin projection 36. Here, if the predetermined value is set to be the same value as the thickness T0 of the general section 34B of the molten resin sheet 34, for example, the top 36A of the molten resin projection 36 can be suppressed from becoming extremely thin. It should be noted that the predetermined value is not limited to the thickness T0 of the general section 34B.

In the method of manufacturing in the above-described embodiment, in the machining process, it is configured that the electromagnetic valve 62 is switched to the neutral (exhaust) state, the pressurizing member 46 moves at the low speed under the low load, and the movable member 44 is thereby pressed to move via the molten resin projection 36. However, the present invention is not limited to this configuration. For example, a configuration may be adopted in which, once the pressurizing member 46 abuts against the molten resin projection 36, the electromagnetic valve 62 is switched to pull in the movable member 44. At this time, the throttle valve 64 is preferably adjusted such that the clearance between the movable member 44 and the pressurizing member 46 can be kept constant. Here, when the servomotors are used as the actuator 50 and the actuator 74, a configuration may be adopted in which, once the pressurizing member 46 abuts against the molten resin projection 36, the movable member 44 starts moving in the opposite direction from the projecting direction of the molten resin projection 36. Alternatively, a configuration may be adopted in which, once the clearance L between the movable member 44 and the pressurizing member 46 becomes the predetermined value (for example, the same value as the thickness T0 of the general section 34B of the molten resin sheet 34), the movable member 44 starts moving in the opposite direction from the projecting direction of the molten resin projection 36. In addition, the servomotor may be used as one of the actuator 50 and the actuator 74 while the air cylinder (or the hydraulic cylinder) may be used as the other thereof.

In the method of manufacturing in the above-described embodiment, it is configured that the tank body 22A and the tank body 22B are formed by the different forming devices and are then joined to form the tank body 22. However, the present invention is not limited to this configuration. For example, a configuration may be adopted in which a forming mold for the tank body 22A and the forming mold 42 are provided and in which a forming device that can mate and join the tank body 22A and the tank body 22B is used to form the tank body 22 before ejection of the tank body 22A and the tank body 22B.

In the fuel tank 20 of the above-described embodiment, the bulge 32 is configured to be formed for the whole periphery along the outer periphery of the projection 24. However, the present invention is not limited to this configuration. For example, the bulge 32 may be divided into plural bulges along the outer periphery of the projection 24. In other words, plural bulging portions may be formed along the outer periphery of, the projection 24. It is possible with such a configuration to reduce the amount of the resin that is required for the attachment section 38.

In the fuel tank 20 of the above-described embodiment, the fastening seat 28 is held to be fixed (fastened) between the bulge 32 of the projection 24 and the general section 22C. However, the present invention is not limited to this configuration. For example, a clearance may be formed between the bulge 32 and the fastening seat 28. Also, with this configuration, the bulge 32 can prevent the projection 24 from being pulled out of the fastening seat 28. Therefore, it is possible to maintain an attachment state of the fuel tank 20 and the attachment part 26.

The one embodiment of the present invention has been described so far. Needless to say, the present invention is not limited to the above embodiment, and various modifications can be made thereto within the scope of the gist of the present invention.

The invention claimed is:

1. A method of manufacturing a fuel tank comprising:
   introducing a molten resin sheet in a forming mold, the molten resin sheet being formed with a tank body formed of a resin;
   shaping a molten resin projection by forming a molten resin projection and abutting a movable member against the molten resin sheet, the molten resin projection being projected in a thickness direction of the molten resin sheet;
   arranging an attachment part on the molten resin sheet by inserting the molten resin projection in an attachment hole provided in the attachment part; and
   machining to make a portion of the molten resin projection bulge out to an outer peripheral side by moving the movable member in an opposite direction from a projecting direction of the molten resin projection while pressurizing the molten resin projection by a pressurizing member in the opposite direction from the projecting direction of the molten resin projection, wherein
during a process in which the portion of the molten resin projection is machined to bulge out to the outer peripheral side, the movable member and the pressurizing member move with a constant clearance being kept between the movable member and the pressurizing member during pressurization of the molten resin projection.

2. The method of manufacturing the fuel tank according to claim 1, wherein
during a process in which the portion of the molten resin projection is machined to bulge out to the outer peripheral side, the movable member starts moving in the opposite direction from the projecting direction of the molten resin projection when the pressurizing member abuts against the molten resin projection.

3. The method of manufacturing the fuel tank according to claim 1, wherein
during a process in which the portion of the molten resin projection is machined to bulge out to the outer peripheral side, the movable member starts moving in the opposite direction from the projecting direction of the molten resin projection when the clearance between the movable member and the pressurizing member becomes a predetermined value.

4. The method of manufacturing the fuel tank according to claim 1, wherein
during a process in which the molten resin projection is formed and shaped, the molten resin sheet is arranged along a mold surface of the forming mold in a state that the movable member is projected from the mold surface.

5. The method of manufacturing the fuel tank according to claim 1, wherein
during a process in which the molten resin projection is formed and shaped, the movable member is projected from a mold surface of the forming mold after the molten resin sheet is arranged along a mold surface, and the molten resin projection is formed.

6. The method of manufacturing the fuel tank according to claim 4, wherein
during the process in which the molten resin projection is formed and shaped, a space between the forming mold and the molten resin sheet is depressurized to arrange the molten resin sheet along the mold surface, or a space between a pressure forming mold, which is mated with the forming mold, and the molten resin sheet is pressurized to arrange the molten resin sheet along the mold surface.

7. The method of manufacturing the fuel tank according to claim 6, wherein
during the process in which the molten resin projection is formed and shaped, the molten resin sheet is arranged along the mold surface after the space between the forming mold and the molten resin sheet is pressurized to stretch the molten resin sheet, so as to secure an extra length with respect to the mold surface, or after the space between the pressure forming mold, which is mated with the forming mold, and the molten resin sheet is depressurized to stretch the molten resin sheet, so as to secure the extra length with respect to the mold surface.

8. The method of manufacturing the fuel tank according to claim 6, wherein
while the molten resin sheet is introduced in the forming mold, the molten resin sheet, an extra length of which is secured with respect to the mold surface, is introduced in the forming mold.

9. The method of manufacturing the fuel tank according to claim 7, wherein: the extra length portion with respect to the mold surface of the forming mold comprises a surface area of a formed surface of the molten resin sheet that is larger than a surface area of the mold surface.

10. The method of manufacturing the fuel tank according to claim 1, wherein
a magnet of the movable member is embedded in a tip of the movable member, a magnet of the pressurizing member is embedded in the pressurizing member, and the magnet of the movable member and the magnet of the pressurizing member are arranged in a direction to generate a repulsive force between the magnet of the movable member and the magnet of the pressurizing member.

* * * * *